United States Patent [19]

Thorsheim

[11] 4,172,689
[45] Oct. 30, 1979

[54] WAVE POWER GENERATOR

[76] Inventor: Ivar Thorsheim, Kalkfjellet 15, 1370 Asker, Norway

[21] Appl. No.: 860,554

[22] Filed: Dec. 14, 1977

[51] Int. Cl.$^2$ ............................................. F04B 48/06
[52] U.S. Cl. ......................................... 415/7; 415/2; 60/398; 290/42; 290/53; 417/330
[58] Field of Search ....................................... 415/2–4, 415/7; 417/330; 60/398; 290/42, 53

[56] References Cited

U.S. PATENT DOCUMENTS

| 1,037,390 | 9/1912 | Wirt | 417/330 |
|---|---|---|---|
| 1,081,867 | 12/1913 | Rousseau | 415/7 |
| 1,338,326 | 4/1920 | Peck | 415/7 |
| 1,476,229 | 12/1923 | Suess | 415/7 |
| 3,965,679 | 6/1976 | Paradiso | 415/2 |
| 4,036,563 | 7/1977 | Tornkvist | 60/398 |
| 4,078,871 | 3/1978 | Perkins | 60/398 |

FOREIGN PATENT DOCUMENTS

| 605673 | 8/1935 | Fed. Rep. of Germany | 415/2 |
|---|---|---|---|
| 2518405 | 11/1976 | Fed. Rep. of Germany | 415/2 |
| 559239 | 9/1923 | France | 415/7 |

Primary Examiner—Everette A. Powell, Jr.
Attorney, Agent, or Firm—Watson, Cole, Grindle & Watson

[57] ABSTRACT

A device for deriving power from the energy of water waves, such as ocean waves, includes a buoyant support base, such as a raft, adapted for floating in open waters and having a keel extending from its bottom surface for stabilizing same in a horizontal position. A plurality of open funnels are mounted on the top surface of the base for collecting a wave and directing it into a manifold mounted at the small ends of the funnels for operating a turbine generator in communication with the manifold. The bottom walls of the funnels extend outwardly of their larger ends so as to define artificial shoals lying beneath the bottom surface of the raft and thus beneath the surface of the water. The shoals cause the waves to break into the funnels, the broken waves tumbling along the funnels and increasing in speed upon movement toward the smaller ends thereof. The smaller ends of the funnels are staggered relative to one another so as to funnel the water into the manifold at different intervals for constant operation of the blades of the generator.

6 Claims, 5 Drawing Figures

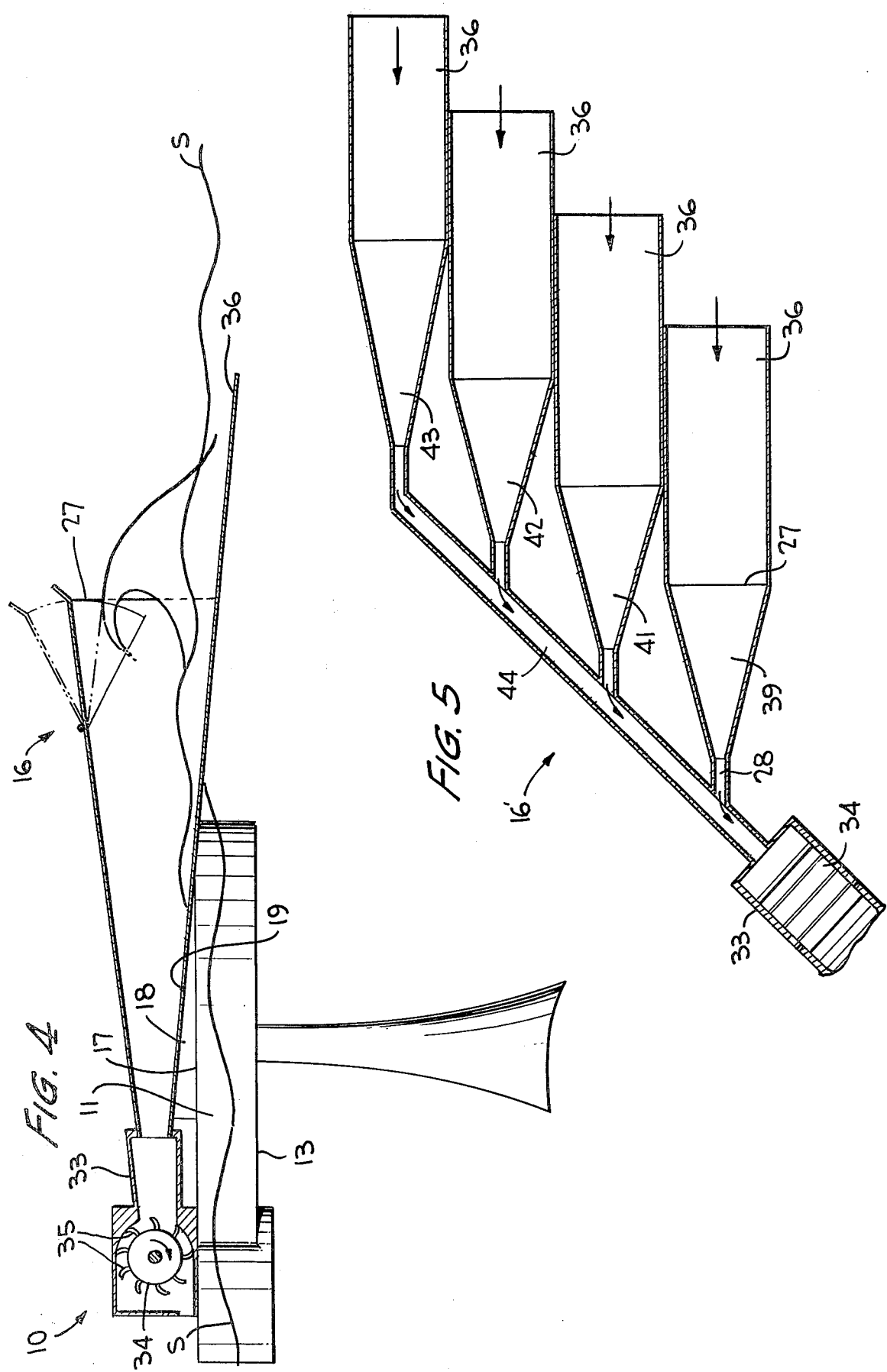

WAVE POWER GENERATOR

BACKGROUND OF THE INVENTION

This invention relates generally to a device for deriving power from the energy of moving water waves, such as ocean waves, and more particularly to such a device for artificially inducing a wave breaking and tumbling action in open waters and for collecting the waves in a manner whereby water currents are created at different intervals for operating a turbine generator.

Devices have been developed in the past for harnessing water wave power although such devices are typically located proximate the shoreline for converting the kinetic energy of the waves into electricity. Some type of jetty having portals or channels is normally disposed on the sea coast so that the normal breaking action of the waves can be used for generating power in the form of electricity upon operation of a turbine generator. Thus, a portion of the energy of the ocean waves is dissipated or lost by the time it reaches the constricted passage along which the broken waves are designed to pass. Moreover, the efficiency of such devices is affected by the changing tides.

SUMMARY OF THE INVENTION

It is therefore an object of the present invention to provide a device for deriving power from the energy of moving water waves by taking full advantage of the wave power at the time it breaks.

Another object of the invention is to provide such a device which causes water current to constantly flow against the blades of a turbine generator for the generation of electricity.

The present device derives power from the energy of moving water waves by inducing a wave breaking and tumbling action in open waters through the use of artificial shoals which catch the broken waves and direct them into funnels. The shoals meet the waves beneath the water level slightly above the revolving water current and force the water to gather into the funnels which have staggered outlets for directing the water at different intervals into a manifold with which the blades of a turbine generator are associated. The funnels therefore gather the induced wave breaks and make use of most of the power (speed, height, pressure and revolving current) of the water rushing through the funnels for operation of the turbine generator blades with little interruption.

Other objects, advantages and novel features of the invention will become more apparent from the following detailed description of the invention when taken in conjunction with the accompanying drawings.

BRIEF DESCRIPTION OF THE DRAWINGS

FIG. 4 is a side elevational view of one of the funnels of FIG. 2; and

FIG. 5 is a top plan view of another embodiment of the device according to the invention.

DETAILED DESCRIPTION OF THE INVENTION

Figure 1:
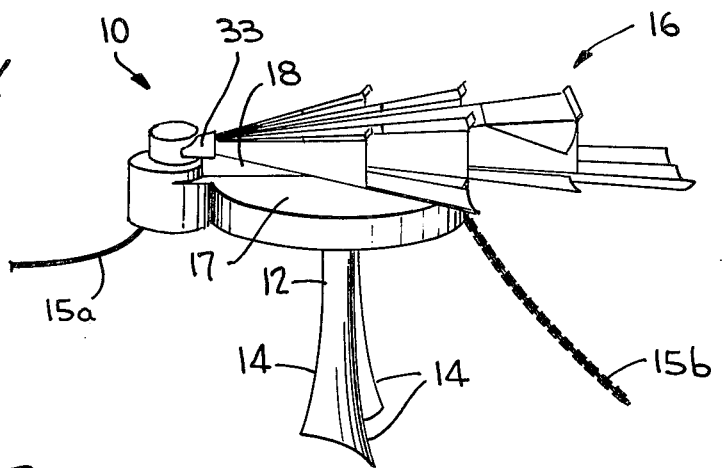
FIG. 1 is a perspective view of one embodiment of the device according to the invention.

Turning now to the drawings wherein like reference characters refer to like and corresponding parts throughout the several views, one embodiment of the device according to the invention is shown at 10 in FIG. 1 for the harnessing of power from the energy of moving water waves, such as ocean waves, for converting that energy into electric power. The device includes a support base member 11 such as a raft of sufficiently rugged construction in order to withstand heavy weather and climatic conditions, although made sufficiently buoyant so as to float in open waters. The raft has an elongated keel 12 extending from bottom surface 13 thereof (FIG. 4) a sufficient distance for stabilizing the raft and for maintaining it in a substantially horizontal position while floating on surface S of the water. The keel has a plurality of vertical blades 14 which function substantially as levers pressing against the rolling action of the waves. The device is moored in open sea in any normal manner as through the use of anchor chains 15a and 15b, although chain 15a may be connected to a drag anchor for effectively steering the device into the direction of the moving water waves.

A funnel assembly 16 (FIG. 2) is mounted on a top surface 17 of the base member, a wedge 18 having an upper surface 19 (FIG. 4) tapering downwardly toward the forward end of the funnel assembly being used to accommodate the funnel assembly and to maintain its forward end below bottom surface 13 and, thus, below surface S of the water. The funnel assembly includes a plurality of funnels 21 through 26 each open at opposite ends and tapering from a larger end 27 to a relatively smaller end 28 thereof as typically shown in FIG. 4. Each funnel has a top wall 29, a bottom wall 31, and side walls 32 converging toward its end 28, as typically shown for funnel 21 in FIG. 2. Adjacent funnels lie against each other at their side walls and are secured together in some manner. And, a section 29a may form a portion of each top wall at end 27 of each funnel. The sections are hinged as at 30 to their top walls for upward movement for a purpose to be discussed hereinafter.

A manifold 33 is mounted on the funnels in communication with the smaller ends thereof which define outlets for admitting water collected by the funnels into the manifold so as to drive an electric turbine generator 34 as the entering water impinges against blades 35 thereof. The walls of the manifold converge toward the generator and are connected to a housing 34a surrounding the generator. Openings (not shown) are provided in housing 34a for outletting water after passing over blades 35. And, the forward ends of the manifold walls are spaced, as at 33a, outwardly of the funnels so as to provide escape outlets for dead water which may accumulate during water flow.

The funnels are shown rectangular in cross-section, although they could be of other cross-sectional shapes, such as circular or oval, without departing from the invention. In any event, the bottom walls of each funnel are extended outwardly of their respective larger ends so as to define artificial shoals 36 which may be of equal length and may each be slightly concave as shown in FIG. 2.

Figure 2:
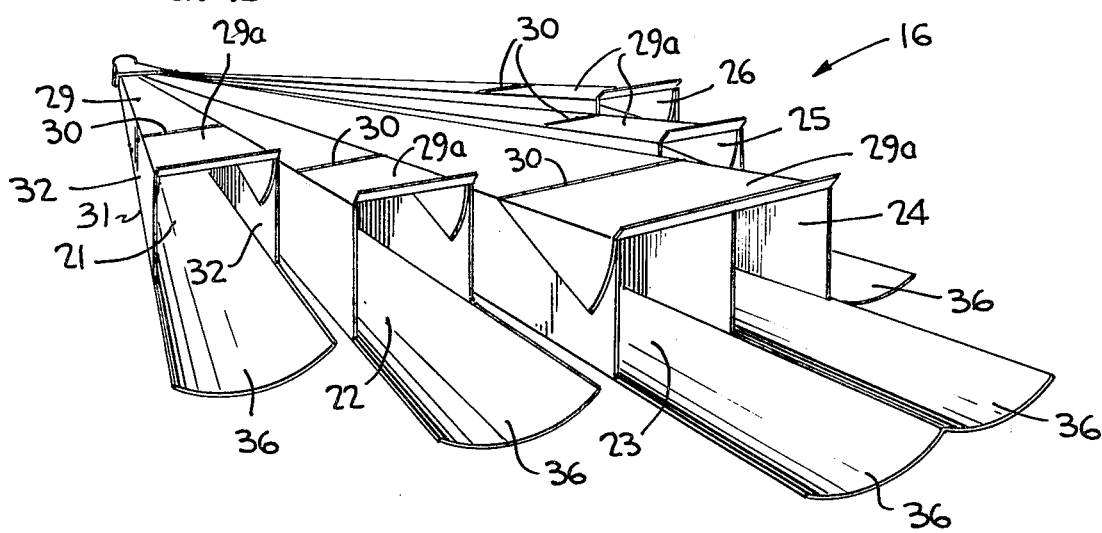
FIG. 2 is a perspective view in slightly enlarged scale of the funnel assembly made part of the FIG. 1 device.
Figure 3:
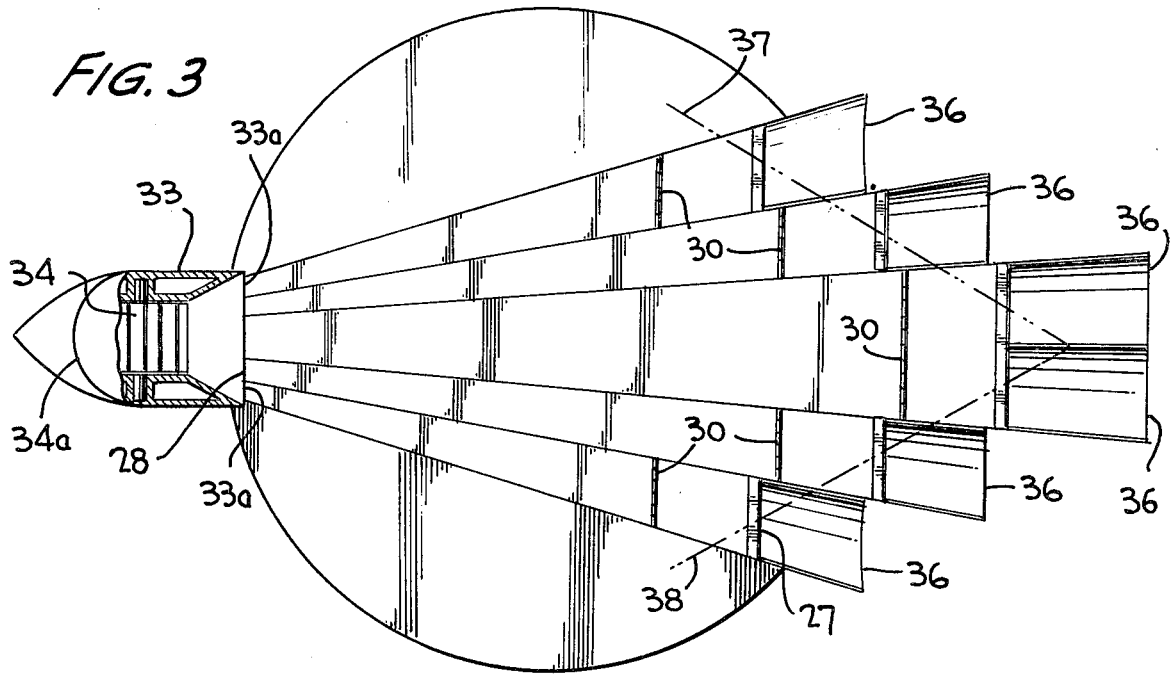
FIG. 3 is a top plan view of the device of FIG. 1, in slightly enlarged scale.

In the FIGS. 1 to 3 embodiment, the funnels are arranged in pairs with the funnels in each pair respectively of equal length although the funnel pairs are of unequal length. The pair of central funnels 23 and 24 are of equal length and are the longest as compared to the remainder, the the pair of funnels 22 and 25 being of the same length and slightly shorter, and the pair of funnels 21 and 26 being of equal length and still slightly shorter. Hence, the larger ends of the various funnels are staggered relative to one another and lie along lines 37 and 38 which are V-oriented and angularly related to the central longitudinal axis of the funnel assembly. Smaller ends 28 of each of the funnels lie in a common plane perpendicular to the central longitudinal axis of the funnel assembly.

In operation, the blades or plates which define artificial shoals 36 for each of the funnels create an artificial steering and tumbling of the wave water and induce the water to proceed (as typically shown in FIG. 4) into the funnels which force the water to speed-up as it moves toward the smaller ends thereof. The funnels function to gather or collect the power of the waves, induced to break by the artificial shoals, and make efficient use of most of the speed, height, pressure and weight of the water as it moves therethrough. Larger ends 27 effectively expand upwardly in response to the size and intensity of the tumbling waves when reaching such ends, as sections 29a are forced to pivot upwardly about their hinged connections. However, such sections 29a would be eliminated if another set of funnels 21 to 26 (not shown) were stacked on top of the funnels as shown. Then, depending on the size and intensity of the tumbling waves reaching the larger ends of the funnels, a portion thereof would enter the upper set of funnels to function in operating the turbine wheel, or another such wheel (not shown) similarly as described above. The water moving through the uniformly tapered funnels causes pulsating water current although, by the time the water current enters the manifold, it will be joined by similar currents emanating from similar funnels reached by the same wave in succession so as to even out the current. The funnel pairs of assembly 16 are exposed to the same wave and essentially work together. Therefore, when the funnel pairs, which are symmetrical about the longitudinal central axis of assembly 16, work together, the first pair 23, 24 will receive the water current shortly before the next pair 22,25 which receives the water current shortly before the following pair 21,26. By the time the wave has reached the last pair of funnels, the next wave will have reached the first pair 23,24 of funnels. The water currents therefore enter manifold 33 at slightly different intervals so as to effect a relatively constant current of water at a high speed and pressure impinging against the blades of the turbine generator for the powering of same. The concave shoals together with aft chain 15a connected to a drag anchor, function to steer device 16 into the direction of the approaching wave so as to confront substantially the full power of the wave.

FIG. 5 illustrates another embodiment of a funnel assembly 16' according to the invention except that each of the funnels 39, 41, 42 and 43 is of equal length. The funnels are otherwise constructed the same as described above, and each has an artificial shoal 36 extending outwardly of the larger end thereof. The larger ends of the funnels are staggered relative to one another and are open in the direction of wave movement illustrated by the arrows adjacent the shoals in this Figure. The smaller ends 28 of the funnels are likewise staggered and open into a manifold pipe 44 which communictes with manifold 33 disposed in communication with turbine generator 34. Assembly 16' functions similarly as described for assembly 16 except that the funnels do not operate in pairs. Nevertheless, a wave moving in the direction of assembly 16' is met first with funnel 43 and, by reason of its artificial shoal, the wave is made to break and enter the funnel in a tumbling action whereupon a water current is created by the narrowing funnel by the time it enters pipe 44 through its smaller open end. After a short interval the same wave is broken by shoal 36 of funnel 42 and the water current thereby caused enters pipe 44 so as to combine with the water current already in the pipe, and so on, with respect to the remaining funnels 31 and 49. While the first wave is tumbling through funnel 39 a following wave will have entered funnel 43 for repeating the action and continuing the water current flow in pipe 44 substantially without interruption.

The artificial shoals of both embodiments are maintained below the surface of the water for catching each wave in open sea before the wave has lost any of its power as occurring when tumbling along a natural beach. The shoal hits the wave beneath the water level slightly above the revolving current thereof and forces the water to gather into tapering funnels in which the water flow is intensified to produce sufficient water power and current to effectively operate the blades of generator 34. And, by reason of the staggered relationship at the smaller ends of the funnels, the water current reaches the turbine generator in an even and steady flow with less pulsation and substantially with less interruption.

Although a plurality of adjacent funnels is needed for carrying out the invention, it should be pointed out that more than the number of funnels as shown in the drawings may be provided without departing from the invention. And, in order to prevent fish and buoyant materials from obstructing the water passage through the device, it may be sheltered by means of a fish net or the like at a predetermined distance in the water ahead of the device.

Obviously, many other modifications and variations of the present invention are made possible in light of the above teachings. For example, device 16' may be mounted on a pier or the like away from the wave breaking shoreline, and the relative lengths of the funnels of both devices may be different than illustrated so long as their smaller ends and/or their larger ends are staggered for effecting flow into the manifold at different intervals so as to present a substantially constant flow to the turbine blades. It is therefore to be understood that within the scope of the appended claims, the invention may be practiced otherwise than as specifically described.

I claim:

1. A device for deriving power from the energy of moving water waves, such as ocean waves, comprising, a buoyant support base member having top and bottom surfaces and adapted to float in open waters, an elongated keel extending outwardly of said bottom surface for stabilizing said base member and maintaining it substantially horizontal while floating a plurality of elongated funnels mounted on said top surface of said base member, said funnels lying adjacent one another and having open opposite ends converging from a larger of said ends to a smaller of said ends for channeling waves along said funnels, said larger ends defining water inlets and said smaller ends defining water outlets, a manifold mounted on said funnels in communication with said smaller ends, a turbine generator having blades mounted in communication with said manifold for effecting operation of said generator as water from said outlets impinges thereagainst, and said bottom walls of said funnels extending outwardly of said larger ends and defining artificial shoals lying below the surface of the water, whereby waves of the same collection are caused to be broken by said shoals and to tumble along said funnels at increasing speed upon movement toward said smaller ends, the power of the waves thereby operating said turbine as the water from said outlets drive said blades.

2. The device according to claim 1, wherein said larger ends of said adjacent funnels are staggered relative to each other so as to lie along at lesst one line disposed at an angle to the longitudinal axis of the device, said smaller ends of said adjacent funnels lying along a line perpendicular to said axis, whereby said funnels produce water currents which reach said manifold at different intervals for causing said turbine to be operated with little interruption.

3. The device according to claim 1, wherein said funnels are of equal length, said smaller ends and said larger ends respectively lying along lines parallel to each other and perpendicular to the longitudinal axis of the device, whereby said funnels produce water currents which reach said manifold at different intervals for causing said turbine to be operated with little interruption.

4. The device according to claim 1, wherein said shoals are concave for effecting a steering of the device into the water waves.

5. The device according to claim 1, wherein pairs of said funnels are of unequal length, said funnels in each said pair being of equal length, the innermost pair of said funnels having the longest length relative to the remaining pairs, and said larger ends lying along a pair of V-oriented lines disposed at angles to the longitudinal axis of the device, whereby the waves from the same collection are broken by said artificial shoals and tumbel along said pairs of funnels at different intervals for creating water currents which reach said manifold at correspondingly different intervals.

6. A device for deriving power from the energy of moving water waves, such as ocean waves, comprising a plurality of elongated funnels adapted to be mounted on a pier or the like in open waters, sadi funnels lying adjacent one another and having open opposite ends converging from a larger of said ends to a smaller of said ends for channeling waves along said funnels, said larger ends defining water inlets and said smaller ends defining water outlets, a manifold mounted on said funnels in communication with said smaller ends, a turbine generator having blades mounted in communication with said manifold for effecting operation of said generator as water from said outlets inpinges thereagainst, and said bottom walls of said funnels extending outwardly of said larger ends and defining artificial shoals lying below the surface of the water, whereby waves of the same collection are caused to be broken by said shoals and to tumble along said funnels at increasing speed upon movement toward said smaller ends, the power of the waves thereby operating said turbine as the water from said outlets drive said blades.

* * * * *